US009240892B1

(12) United States Patent
Bicknell

(10) Patent No.: US 9,240,892 B1
(45) Date of Patent: Jan. 19, 2016

(54) METHOD AND APPARATUS FOR REDUCTION OF COMMUNICATIONS MEDIA ENERGY CONSUMPTION

(75) Inventor: Jeremy Bicknell, Santa Clara, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 511 days.

(21) Appl. No.: 13/244,586

(22) Filed: Sep. 25, 2011

(51) Int. Cl.
*H04L 12/12* (2006.01)
*H04L 27/26* (2006.01)
*H04B 1/707* (2011.01)
*H04B 1/30* (2006.01)

(52) U.S. Cl.
CPC ............ *H04L 12/12* (2013.01); *H04L 27/2647* (2013.01); *H04B 1/30* (2013.01); *H04B 1/707* (2013.01)

(58) Field of Classification Search
None
See application file for complete search history.

(56) References Cited

U.S. PATENT DOCUMENTS

| 7,386,042 B1* | 6/2008 | Brewer ........................ 375/226 |
| 2004/0252668 A1* | 12/2004 | Ozukturk et al. ............. 370/335 |
| 2011/0142100 A1* | 6/2011 | Farmer et al. ................. 375/148 |
| 2012/0321024 A1* | 12/2012 | Wasiewicz et al. ........... 375/346 |

OTHER PUBLICATIONS 802.3azTM IEE Standard for Information technology Amendment 5: Media Access Control Parameters, Physical Layers, and Management Parameters for Energy Efficient Ethernet.
Ken Christensen, Pedro Reviriego, Bruce Nordman and Michael Bennett, Mehrgan Mostowfi, Juan Antonio Maestro, IEEE 802.3az: The Road to Energy Efficient Ethernet IEEE Communications Magazine • Nov. 2010.
A. Odlyzko, "Data Networks are Lightly Utilized, and will Stay that Way," Rev. Net. Economics, vol. 2, No. 3, Sep. 2003, pp. 210-237.
Shan Gao, Jia Zhou, Naoki Yamanaka, Reducing Network Power Consumption Using Dynamic Link Metric Method and Power off Links.
Ken Christensen, Chamara Gunaratne, Bruce Nordman, and Stephen Suen, "Reducing the Energy Consumption of Ethernet with Adaptive Link Rate (ALR)" IEEE Transactions on Computer.
Jeremy Bicknell, "Energy Efficient Interoperability of Network Transport Equipment", Paper submitted Mar. 7, 2011, ACM/IEEE Int'l. Workshop on Quality of Service Jun. 5-7, 2011 in San Jose. California.

* cited by examiner

*Primary Examiner* — Leon-Viet Nguyen
(74) *Attorney, Agent, or Firm* — Heimlich Law, PC; Alan Heimlich, Esq.

(57) ABSTRACT

A Method and Apparatus for Reduction of Communications Media Energy Consumption have been disclosed. Media energy consumption can be reduced by mapping a periodic data pattern in data to an alternate data pattern that consumes less energy when the alternate pattern is transmitted on the communications media in place of the original data pattern. The detection of the original selected patterns and the choice of replacement patterns may be made automatically or according to the transmission state (for example, idle or alarm).

20 Claims, 10 Drawing Sheets

1. A method comprising:
   receiving a string of data for transmission;
   detecting a sequence in said string of data for transmission that has a predetermined period of periodicity that would result in a transmission of said string of data for transmission being above a predetermined energy threshold; and
   replacing said string of data for transmission with a low power string of data for transmission, wherein said low power string of data for transmission has a predetermined period of periodicity that would result in a transmission of said low power string of data for transmission being below a predetermined low energy threshold.

2. The method of claim 1 wherein said predetermined energy threshold is predetermined before said receiving said string of data for transmission.

3. The method of claim 2 wherein said predetermined low energy threshold is predetermined before said receiving said string of data for transmission.

4. The method of claim 3 wherein said predetermined low energy threshold is said predetermined energy threshold.

5. The method of claim 4 further comprising not replacing said string of data for transmission, when said string of data for transmission has a predetermined period of periodicity that would result in a transmission of said string of data for transmission being at said predetermined low energy threshold.

6. The method of claim 4 further comprising replacing said string of data for transmission with a low power string of data for transmission, wherein said low power string of data for transmission has a predetermined period of periodicity that would result in a transmission of said low power string of data for transmission being at said predetermined low energy threshold.

7. The method of claim 1 wherein said predetermined energy threshold is determined after said receiving said string of data for transmission.

8. The method of claim 2 wherein said predetermined low energy threshold is determined after said receiving said string of data for transmission.

9. The method of claim 1 wherein said string of data for transmission is a protocol data string that represents idle data.

10. The method of claim 1 wherein said string of data for transmission is a datastream that indicates an alarm condition.

11. The method of claim 1 where said low power string of data for transmission conforms to a same line code specification as said string of data for transmission.

12. The method of claim 1 where said low power string of data for transmission does not conform to a same line code specification as said string of data for transmission.

13. The method of claim 12 wherein said string of data for transmission has a High-Density Bipolar 3 (HDB3) line code and said low power string of data for transmission has a line code of Alternate Mark Inversion (AMI).

14. The method of claim 1 further comprising: transmitting over a medium said string of data for transmission or said low power string of data for transmission.

FIG. 9

15. The method of claim 14 wherein said medium is selected from the group consisting of a wired connection, a wireless radio link, an optical fiber, and a free space optical channel.

16. The method of claim 1 wherein said detecting a sequence and said replacing are performed by a control agent.

17. The method of claim 1 wherein said detecting a sequence and said replacing are made automatically according to a transmission state selected from the group consisting of idle and alarm.

18. A method comprising:
receiving a datastream, said datastream to be transmitted over a medium;
determining for a specific period of said datastream an energy required to transmit said specific period of said datastream over said medium;
determining when for said specific period of said datastream there is an alternative datastream that conveys a same information as said specific period of said datastream and uses lower energy than said energy required to transmit said specific period of said datastream over said medium;
replacing said specific period of said datastream with said alternative datastream; and
transmitting said alternative datastream over said medium.

19. An apparatus comprising:
means for receiving a datastream, said datastream to be transmitted over a medium;
means for determining for a specific period of said datastream an energy required to transmit said specific period of said datastream over said medium;
means for determining when for said specific period of said datastream there is an alternative datastream that conveys a same information as said specific period of said datastream and uses lower energy than said energy required to transmit said specific period of said datastream over said medium;
means for replacing said specific period of said datastream with said alternative datastream; and
means for transmitting said alternative datastream over said medium.

20. The apparatus of claim 19 wherein said means for determining when for said specific period of said datastream there is an alternative datastream that conveys a same information as said specific period of said datastream and uses lower energy than said energy required to transmit said specific period of said datastream over said medium further comprises a control agent.

FIG. 10

METHOD AND APPARATUS FOR REDUCTION OF COMMUNICATIONS MEDIA ENERGY CONSUMPTION

FIELD OF THE INVENTION

The present invention pertains to energy consumption. More particularly, the present invention relates to a Method and Apparatus for Reduction of Communications Media Energy Consumption.

BACKGROUND OF THE INVENTION

The total annual global electricity consumption by the telecom industry has been estimated at 164 billion kWh. In the USA alone, the Verizon 2006 network consumes 8.9 TWh, 0.24% of the USA's total energy consumption. This presents a problem.

Many data protocols send high energy patterns when there is no data to transmit. For example, the HDLC (High-Level Data Link Control) protocol used in the Ethernet MAC (Media Access Control) layer uses the pattern 01111110 to indicate idle periods between frames of data. This decreases average energy efficiency because more energy is used to transmit idle patterns than data patterns. Networks transport data with low link utilization, 80% idle is not unusual. True zeroes cannot be used during idle periods because transition to and from loss of signal states is generally integrated over periods of between 10 and 255 UI with 1 UI having a period of 488 us in E1 mode and 648 ns in T1 mode. This LOS (Loss Of Signal) detection and clearing delay is too long and would disrupt normal transmission. This presents a problem.

Previous efforts at lowering power include powering down the transmitter for a link during idle periods and deferring transmission to lengthen idle periods and make the average efficiency higher, however, they do not deal with maintaining synchronization over the link or dealing with non-idle-state periodic high energy data patterns such as idle data generated remotely and being transported by the link. This presents a problem.

Another previous effort is with ADSL2 and ADSL2+ in which states L2 and L3 were conceived to offer degraded performance but lower power states together with a method for switching between them. This presents a problem.

Thus there is a need for a technical solution to this technical problem that does not conceive any degradation of transmission performance.

BRIEF DESCRIPTION OF THE DRAWINGS

The invention is illustrated by way of example and not limitation in the figures of the accompanying drawings in which:

FIG. 9 shows various embodiments of the invention; and

FIG. 10 shows various embodiments of the invention.

DETAILED DESCRIPTION

Figure 1:
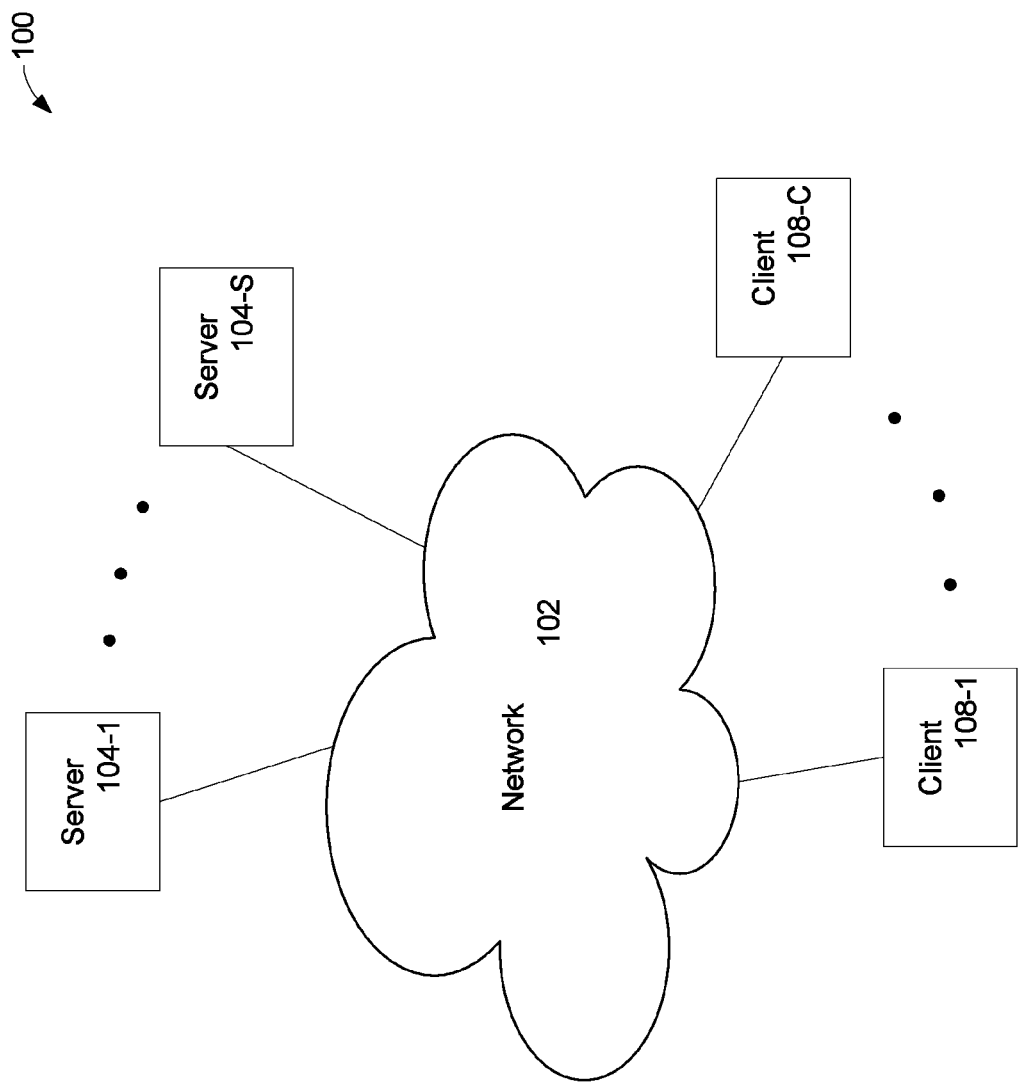
FIG. 1 illustrates a network environment in which the method and apparatus of the invention may be implemented.

In one embodiment of the invention, using the disclosed techniques addresses the power used to transmit data over copper wire or optical fiber, however the invention is not so limited and the techniques disclosed may also be applied to wireless and/or free space optics.

In one embodiment of the invention, for example, in the B8ZS (Bipolar with 8 Zeros Substitution) line code a sequence of 8 zeroes rather than using the prior art approach of 4 pulses which would consume the same energy as 50% 1s density data, the present invention substitutes a lower power code (e.g. 10000000). This is done so that the far end receiver circuits can recover data and clock. The sequence is removed at the receiver and replaced by 0s for onward transmission and processing.

Additionally in another embodiment of the invention, for example, the B8ZS line code might be replaced by, for example, 10000000 which is lower power and the real data pattern 10000000 which may not occur frequently may be replaced by another sequence and therefore the overall energy usage is reduced. In this scenario the substituted sequences are removed at the receiver and replaced by their respective original line codes.

In one embodiment of the invention, a string of data of is received, then a sequence in the string of data for transmission is determined that has a predetermined periodicity that would result in the transmission of said data above a predetermined energy threshold, then replace said data with a low power code that reduces the energy requirement of the encoded and transmitted data stream.

In one embodiment of the invention, a sequence in the string of data that has a predetermined randomness that would result in the transmission of said data below a predetermined energy threshold is determined and then forwarding the string of data without replacement for encoding and transmission.

In one embodiment of the invention, a) a string of data of is received, then a sequence in the string of data for transmission is determined that has a predetermined periodicity that would result in the transmission of said data above a predetermined energy threshold, then replace said data with a low power code that reduces the energy requirement of the encoded and transmitted data stream, and b) a sequence in the string of data that has a predetermined randomness that would result in the transmission of said data below a predetermined energy threshold is determined and then forwarding the string of data without replacement for encoding and transmission.

For example, in an example implementation, states are established during which a continuous high energy sequence in the transmitted data is replaced by a low power code sequence.

In one embodiment of the invention, transmission of the low power code can be controlled by a state controller in which state information is exchanged across the link.

In one embodiment of the invention, each high energy code in the data may be replaced by a low power code. Using this approach, to avoid confusion at the receiver, the low power code substitution is 'escaped' to another value so that it can pass through the decoder.

In one embodiment of the invention, the code substituted may be an existing code (i.e. not a new one), however the low power code is substituted (i.e. replaces the code that would have been transmitted).

In one embodiment of the invention, in another example, the low power code violates existing coding rules but is supported by an extended link capability. The extended link capability in this case is managed by a management entity that, for example, suppresses alarms from propagating through the network when the low power code is received or transmitted.

The advantage of the present invention over previous attempts at reducing power are the continued ability to maintain clock quality, reduction or elimination of disruption to transmission, ability to use the same method for any long sequence of high power data (not just idle) and comprehension of the different energy characteristics of the combination of communications medium, driver technology and data encoding used in a specific datalink.

In one embodiment of the invention, an alternative method in which the string of data for transmission is a protocol data string that represents idle data (if this link is transporting idle data that was added remotely by a link that continued to transmit while idle) may be used.

In one embodiment of the invention, an alternative method in which the string of data is a datastream that indicates an alarm condition may be used.

In one embodiment of the invention, an alternative method in which the replacement low power code conforms to the same line code specification as the data that is transmitted without replacement may be used. For example this covers the case where alternative implementations of the present invention substitute the low power line code according to the present invention at some other location and transport it unaltered through the actual data link.

In one embodiment of the invention, an alternative method in which the encoding and transmission is modified to a different specification such that the replacement line code can be transmitted that conforms to a different line code than the line code that is used for transmission of data without replacement (for example in this alternative the line code could be modified from HDB3 (High-Density Bipolar 3) to AMI (Alternate Mark Inversion) for the duration of the low power transmission) may be used.

In one embodiment of the invention, an alternative method and apparatus where the transmission medium is a wireless radio link may be used.

In one embodiment of the invention, an alternative method and apparatus where the transmission medium is an optical fiber may be used.

In one embodiment of the invention, an alternative method in which a control agent determines the replacement of the string of data with a low power code may be used.

In one embodiment of the invention, the techniques disclosed may be used in switches, for example, but not limited to PCI-e switches, sRIO switches, etc.

In embodiments of the invention, the techniques disclosed may be used in any device that transmits data over any medium including backplane, cable, optical fiber, and wirelessly.

In one embodiment of the invention, substitution of standard idle codes with low power ones is used.

In one embodiment of the invention, automatic or fast switching of line codes in hardware e.g. from HDB3 to AMI is used.

In one embodiment of the invention, the techniques for power reduction are especially useful to underutilized datalinks, time sensitive periodic traffic such as video, audio and sensor networks.

Figure 3:
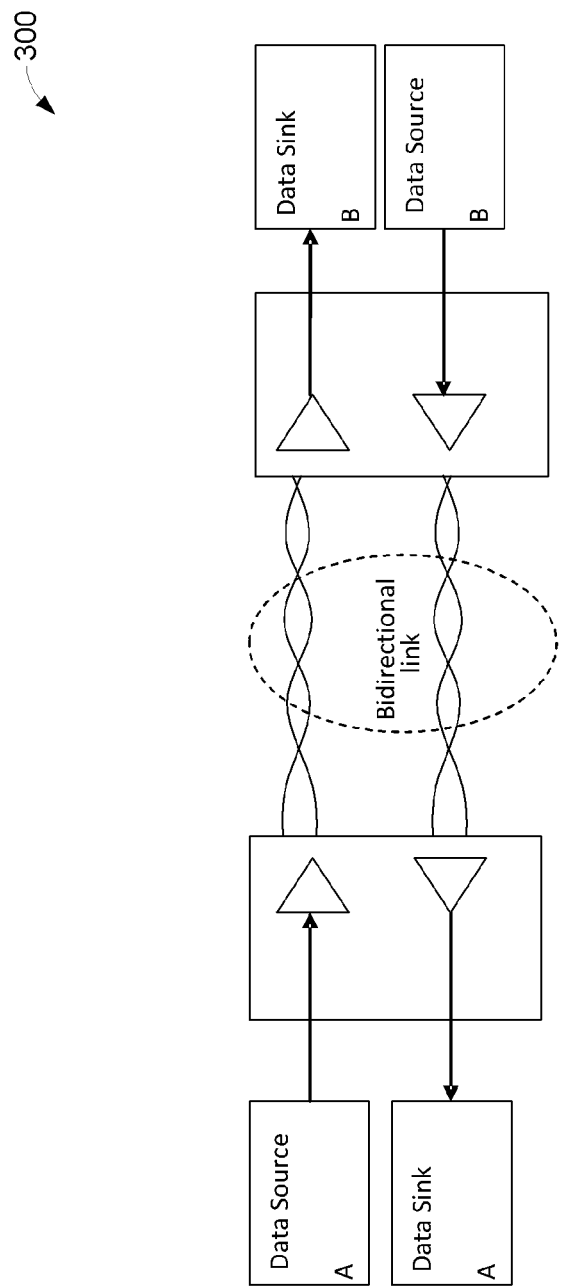
FIG. 3 illustrates a simplified link state operation for illustrating embodiments of the invention.

FIG. 3 illustrates, generally at 300, a simplified link state operation for illustrating embodiments of the invention. Each side A and B can transmit for example, Data, Alarms, Test measurement signals (e.g. probes). Each receive side A and B can be in various states, for example, receiving data—in service, receiving data—out of service, and Loss of signal (LOS).

Figure 4A:
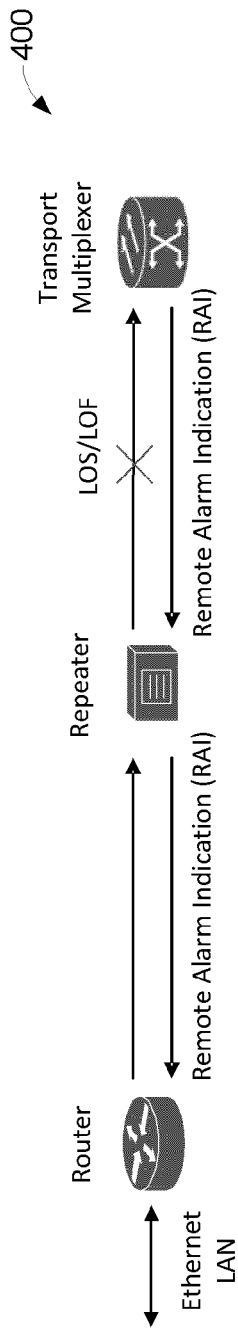
FIG. 4A, FIG. 4B, and FIG. 4C illustrate a link operation for illustrating embodiments of the invention.
Figure 4B:
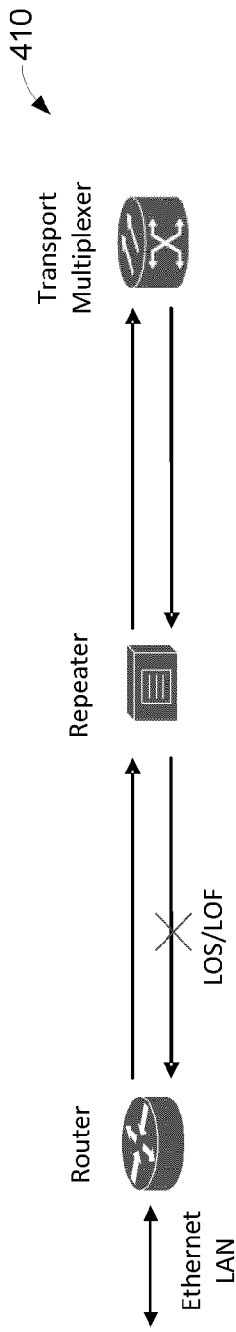
Figure 4C:
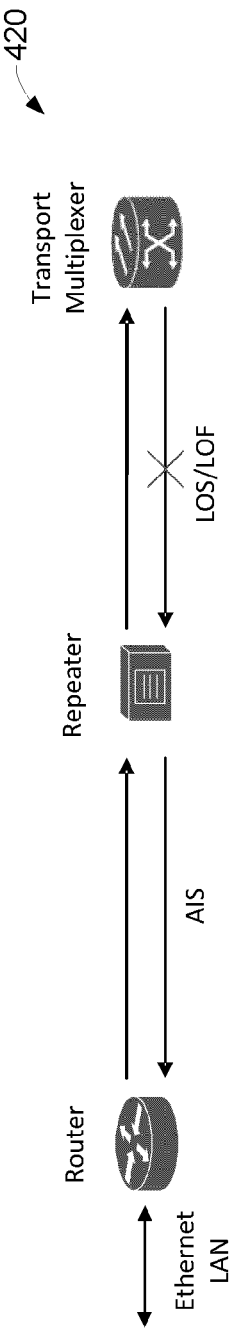

FIG. 4A, FIG. 4B, and FIG. 4C illustrate, generally at 400, 410, and 420 respectively, a link operation for illustrating embodiments of the invention. LOS is loss of signal. LOF is loss of frame. Here in this network example, a router is connected via a repeater to a T1 multiplexor.

In FIG. 4A a T1 Multiplexer receives loss of signal and sends yellow alarm (RAI) towards the router. A loss of signal at the T1 multiplexer receiver results in the multiplexer sending a yellow alarm (RAI) towards the router. The RAI is a framed alarm and payload data can accompany the alarm. The RAI results in local actions, including the rerouting of traffic until the RAI is cleared. Normal data continues to be sent on the router transmit interface.

In FIG. 4B the Router receives loss of signal and sends normal frames towards the T1 Multiplexer. A loss of signal at the router receiver results in local actions such as re-routing of traffic until the LOS condition is clear. Normal data continues to sent on the router transmit interface.

In FIG. 4C Router receives AIS from repeater indicating that the repeater has received loss of signal from the T1 multiplexer. An AIS received at the router receiver results in local actions, perhaps including the re-routing of traffic until the AIS condition has been cleared.

A Yellow alarm is also known as RAI may be sent in data overhead or by setting bit 2 in all timeslots to 0. AIS is either an all ones or a framed 1010 pattern.

Figure 5:
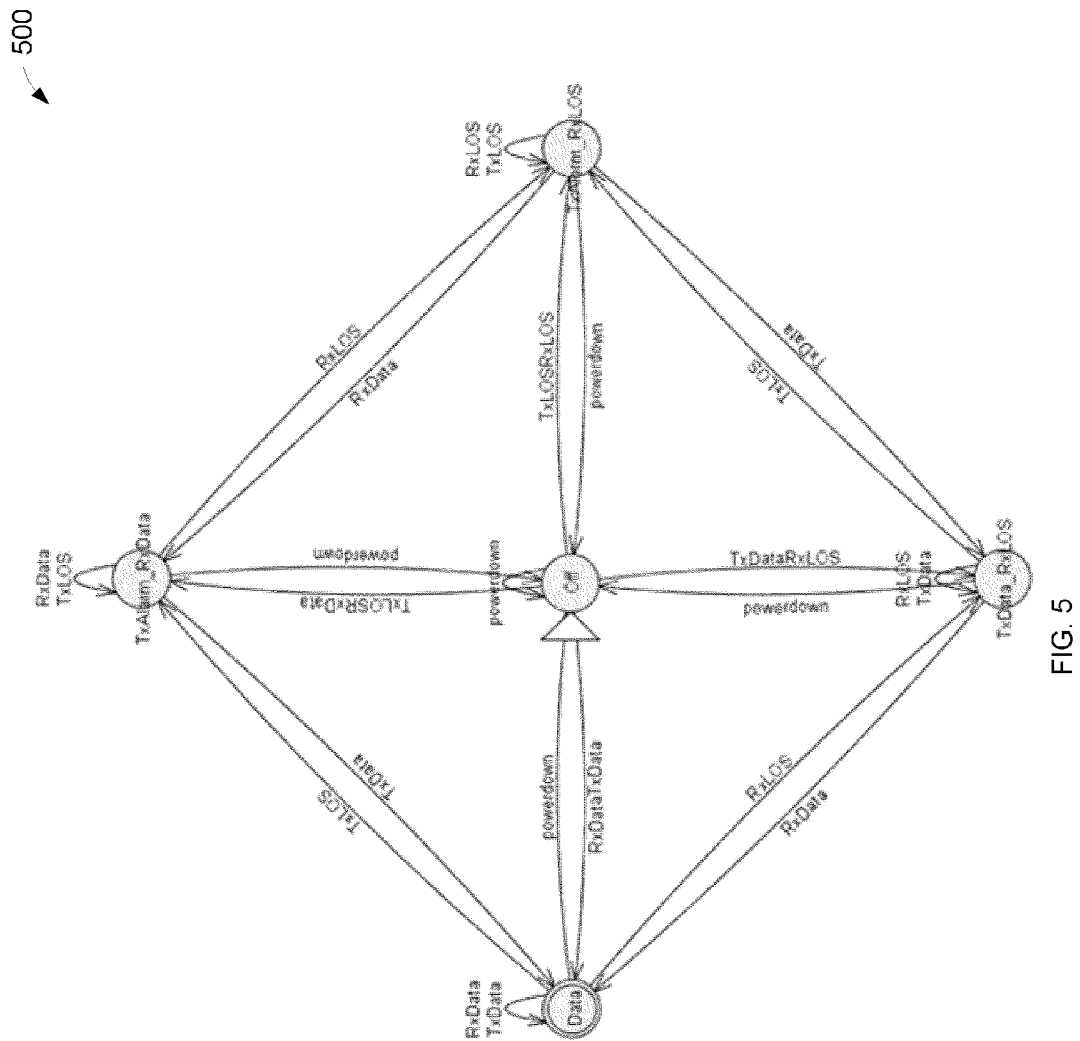
FIG. 5 illustrates a finite state machine.

FIG. 5 illustrates generally at 500, for the example FIG. 4A, FIG. 4B, and FIG. 4C, the finite state machine.

Transition to and from LOS or LOF is generally integrated over periods of between 10 and 255 UI with 1 UI having a period of 488 us in E1 mode and 648 ns in T1 mode.

From an energy efficiency point of view as can be seen alarms, periods of idle data transmission and long periods with all zeroes data cause an increase in power used in transmitting data. This increase in power is many orders of magnitude greater than the energy that is used to process data to replace long sequences of unchanged data. In one embodiment of the invention the link operates at lower power when there is no data to transmit and can quickly transmit data once data is available.

Figure 6:
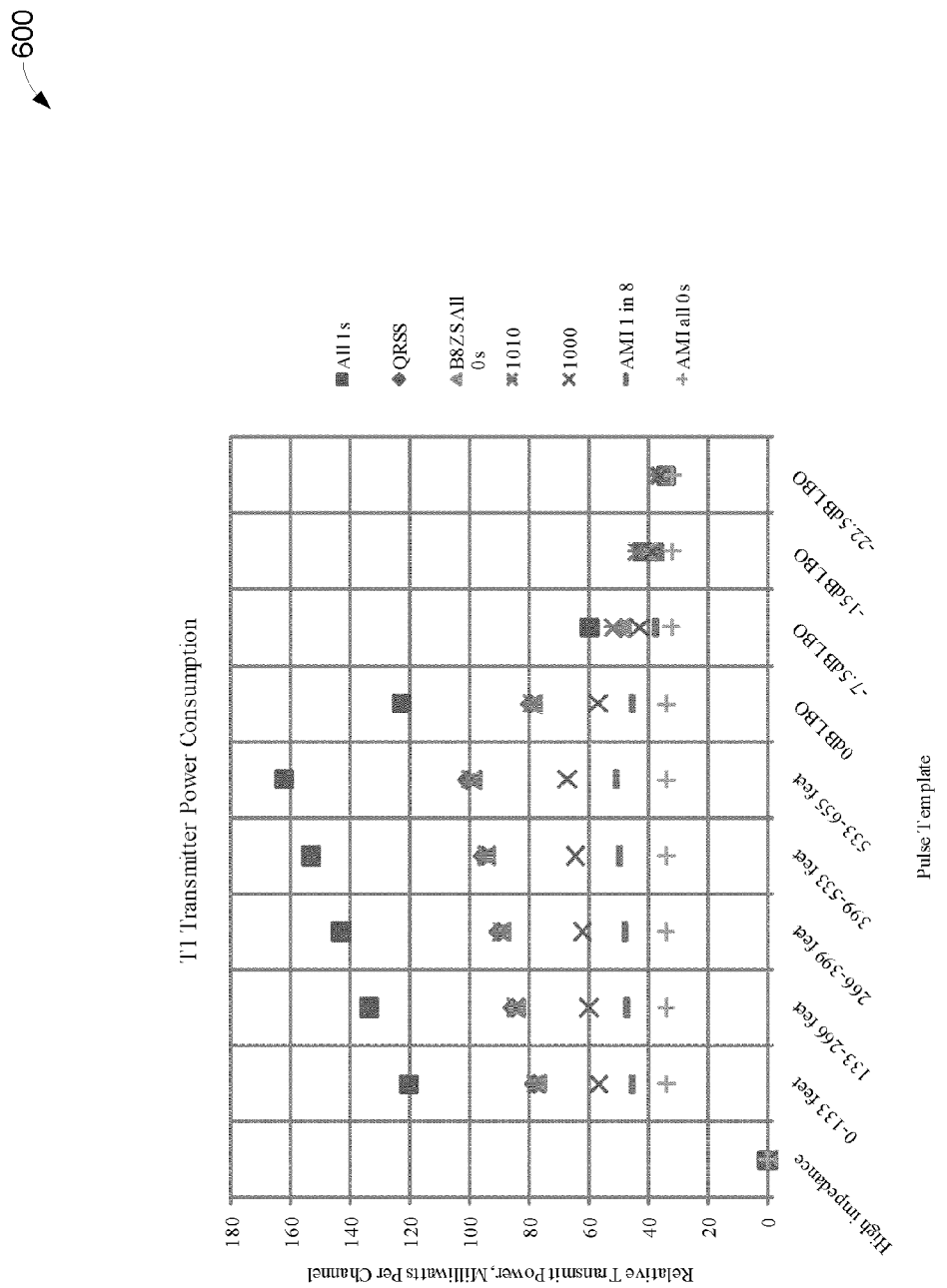
FIG. 6 illustrates various embodiments of the invention showing the relative transmit power for T1.
Figure 7:
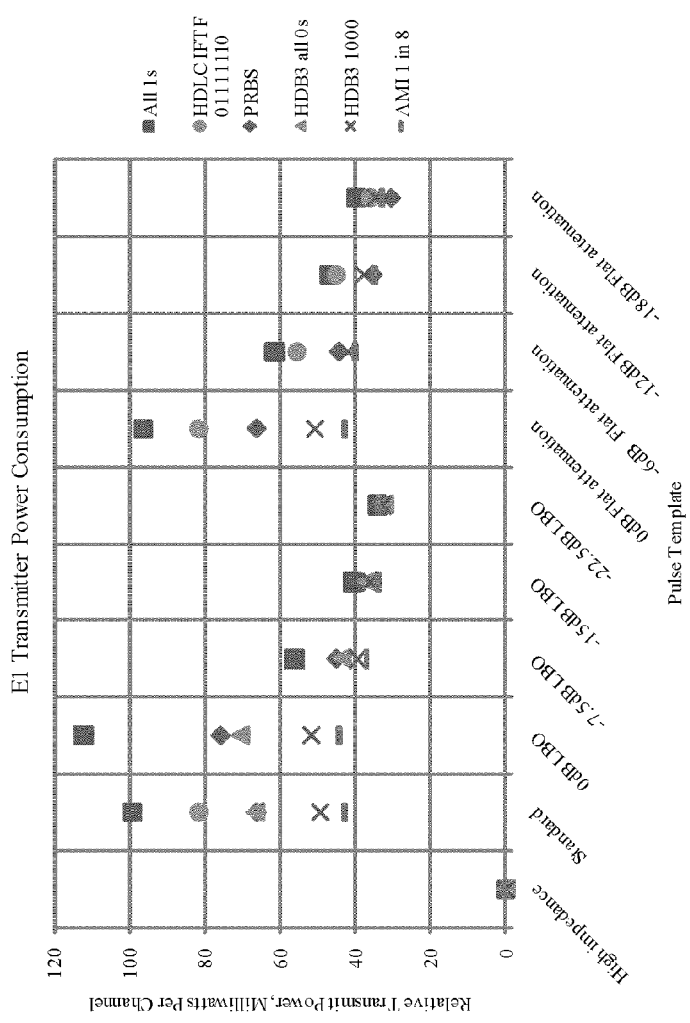
FIG. 7 illustrates various embodiments of the invention showing the relative transmit power for E1.

FIG. 6 illustrates, generally at 600, various embodiments of the invention showing the relative transmit power (Y axis) versus the pulse template at different distances and LBO (Line Build Out) (X axis) for T1. The legend at the right indicates various transmit patterns FIG. 7 illustrates, generally at 700, various embodiments of the invention showing the relative transmit power (Y axis) versus the pulse template at different distances and LBO (Line Build Out) (X axis) and fixed attenuation for E1. The legend at the right indicates various transmit patterns.

The legend in FIG. 6 and FIG. 7 are:

T1: QRSS, a B8ZS encoded $2^{20}-1$ pattern, 1048575 bits long, specified in ITU-T recommendation 0.151.

T1: all 1s.

T1: all zeroes, B8ZS encoded. This pattern consists of all-zero B8ZS encoded data that results in bipolar violations included in the line code specifications.

T1: 1000. Since there are less than 4 zeroes, this pattern does not cause additional bipolar violations (pulses) to be inserted in the line code.

T1: 1010. This is an alternative alarm signal to all 1s that approximates the density of actual data.

T1: 1 in 8, B8ZS encoded. An experimental pattern evaluated as a potential low power idle signal. This signal has sufficient transitions to be below both the excessive zeros (EXZ) threshold of 8 consecutive zeroes as well as the minimum standard LOS threshold of 10 UI.

T1: AMI all zeroes. A completely quiescent signal (no pulses) used for baseline comparison purposes. This signal will generate LOS in the paired receiver.

E1: PRBS: This is an HDB3 encoded 2^15-1 pattern specified in ITU-T recommendation O.151.

E1: all 1s.

E1: all zeroes, HDB3 encoded. This pattern consists of all-zero HDB3 encoded data that results in bipolar violations included in the line code specifications.

E1: 1000, HDB3 encoded. Since there are less than 4 zeroes, unlike HDB3 encoded all zeroes, this pattern does not cause additional bipolar violations (pulses) to be inserted.

E1: 1 in 8, AMI encoded. An experimental signal evaluated as a potential low power idle signal. This signal has sufficient transitions to be below the standard LOS threshold of 10 UI and most receivers should be able to recover this signal error-free without modifications.

Figure 8:
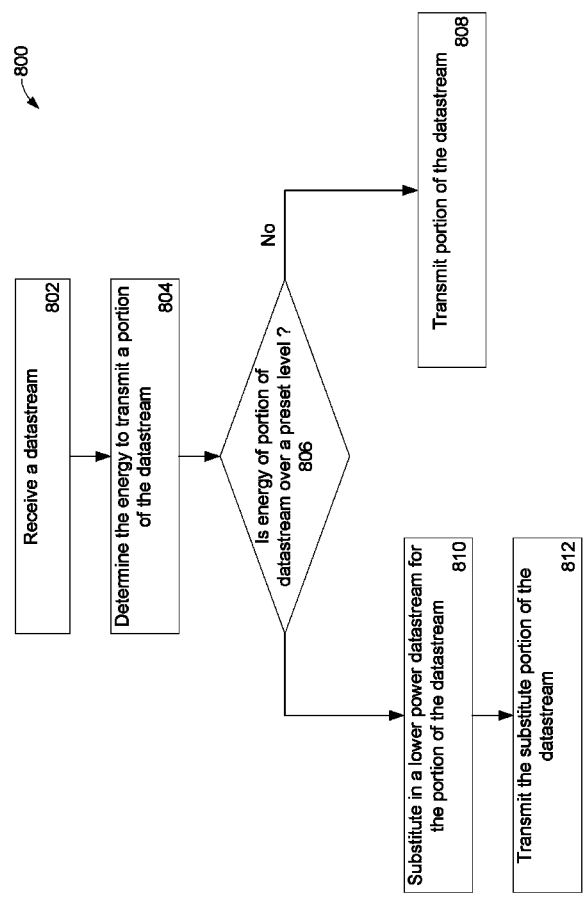
FIG. 8 illustrates one embodiment of the invention.

FIG. 8 illustrates, generally at 800, one embodiment of the invention. At 802 a datastream is received. At 804 the energy to transmit a portion of the datastream is determined. At 806 the energy is compared to a preset level. If not over the preset level than at 808 the portion is transmitted. If over the preset level then at 810 substitute a lower power datastream containing the same information and at 812 transmit the substitute datastream.

FIG. 9 and FIG. 10 illustrate various embodiments of the present invention.

Thus a method and apparatus for reduction of communications media energy consumption circuit have been described.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
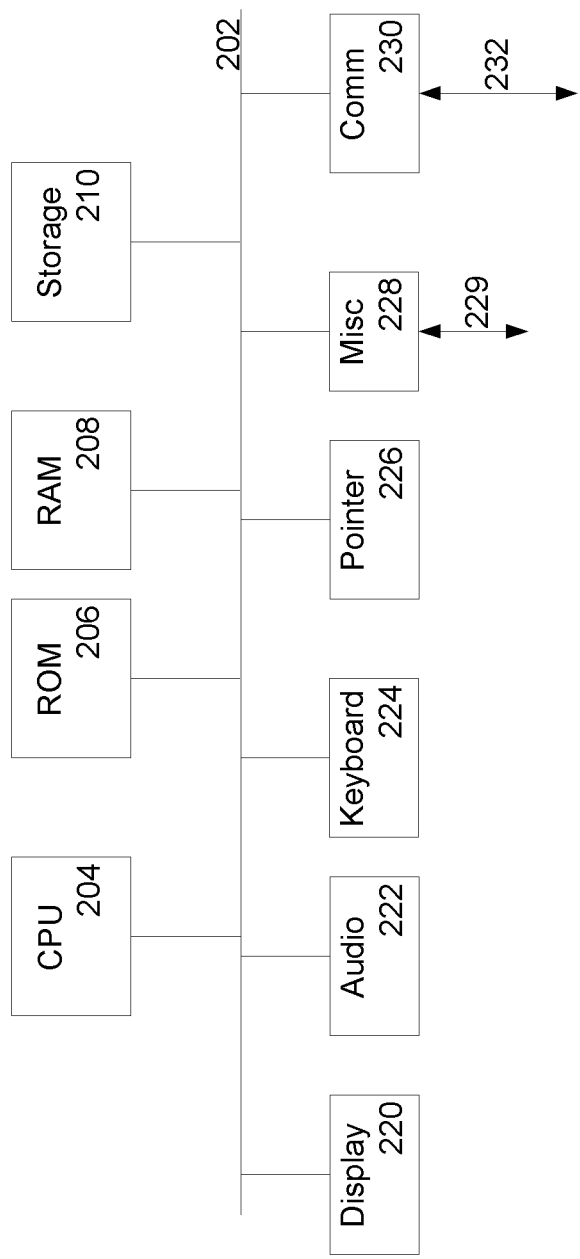
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio 222, keyboard 224, pointer 226, miscellaneous input/output (I/O) devices 228, link 229, communications 230, and port 232. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any non-transitory mechanism for storing or transmitting information in a form readable by a machine (e.g., a computer). For example, a machine-readable medium includes read only memory (ROM); random access memory (RAM); magnetic disk storage media; optical storage media; flash memory devices; mechanical, electrical, optical, acoustical or other forms of non-transitory signals.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

As used in this description "low power" or "lower power" or similar language refers to a comparison with the industry standard at the time of this invention.

As used in this description, "line code specification", "line code" or similar language is understood by one of skill in the art to refer to the modulation method (code) for a signal for transmission on a particular type of transmission medium (line).

As used in this description "datastream" or "data stream" are considered to refer to a stream of data.

It is to be understood that in any one or more embodiments of the invention where alternative approaches or techniques are discussed that any and all such combinations as might be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus for reduction of communications media energy consumption circuit have been described.

What is claimed is:

1. A method comprising:
   receiving a source digital string of data for transmission, said source digital string of data having no interference;
   detecting a sequence in said source digital string of data for transmission that has a predetermined period of periodicity that would result in a transmission of said source digital string of data for transmission being above a predetermined energy threshold; and
   replacing said source digital string of data for transmission with a low power source digital string of data for transmission, said low power source digital string of data having no interference wherein said low power source digital string of data for transmission has a predetermined period of periodicity that would result in a transmission of said low power source digital string of data for transmission being below a predetermined low energy threshold.

2. The method of claim 1 wherein said predetermined energy threshold is predetermined before said receiving said source digital string of data for transmission.

3. The method of claim 2 wherein said predetermined low energy threshold is predetermined before said receiving said source digital string of data for transmission.

4. The method of claim 3 wherein said predetermined low energy threshold is said predetermined energy threshold.

5. The method of claim 4 further comprising not replacing said source digital string of data for transmission when said source digital string of data for transmission has a predetermined period of periodicity that would result in a transmission of said source digital string of data for transmission being at said predetermined low energy threshold.

6. The method of claim 4 further comprising
   replacing said source digital string of data for transmission with a low power source digital string of data for transmission, wherein said low power source digital string of data for transmission has a predetermined period of periodicity that would result in a transmission of said low power source digital string of data for transmission being at said predetermined low energy threshold.

7. The method of claim 1 wherein said predetermined energy threshold is determined after said receiving said source digital string of data for transmission.

8. The method of claim 2 wherein said predetermined low energy threshold is determined after said receiving said source digital string of data for transmission.

9. The method of claim 1 wherein said source digital string of data for transmission is a protocol data string that represents idle data.

10. The method of claim 1 wherein said source digital string of data for transmission is a datastream that indicates an alarm condition.

11. The method of claim 1 where said low power source digital string of data for transmission conforms to a same line code specification as said source digital string of data for transmission.

12. The method of claim 1 where said low power source digital string of data for transmission does not conform to a same line code specification as said source digital string of data for transmission.

13. The method of claim 12 wherein said source digital string of data for transmission has a High-Density Bipolar 3 (HDB3) line code and said low power source digital string of data for transmission has a line code of Alternate Mark Inversion (AMI).

14. The method of claim 1 further comprising:
    transmitting over a medium said source digital string of data for transmission or said low power source digital string of data for transmission.

15. The method of claim 14 wherein said medium is selected from the group consisting of a wired connection, a wireless radio link, an optical fiber, and a free space optical channel.

16. The method of claim 1 wherein said detecting a sequence and said replacing are performed by a control agent.

17. The method of claim 1 wherein said detecting a sequence and said replacing are made automatically according to a transmission state selected from the group consisting of idle and alarm.

18. A method comprising:
    receiving a source digital datastream, said source digital datastream having no interference said source digital datastream to be transmitted over a medium;
    determining for a specific period of said source digital datastream an energy required to transmit said specific period of said source digital datastream over said medium;
    determining when for said specific period of said source digital datastream there is an alternative source digital datastream said alternative source digital datastream having no interference that conveys a same information as said specific period of said source digital datastream and uses lower energy than said energy required to transmit said specific period of said source digital datastream over said medium;
    replacing said specific period of said source digital datastream with said alternative source digital datastream; and
    transmitting said alternative source digital datastream over said medium.

19. An apparatus comprising:
    means for receiving a source digital datastream, said source digital datastream having no interference said source digital datastream to be transmitted over a medium;
    means for determining for a specific period of said source digital datastream an energy required to transmit said specific period of said source digital datastream over said medium;
    means for determining when for said specific period of said source digital datastream there is an alternative source digital datastream said alternative source digital datastream having no interference that conveys a same information as said specific period of said source digital datastream and uses lower energy than said energy required to transmit said specific period of said source digital datastream over said medium;
    means for replacing said specific period of said source digital datastream with said alternative source digital datastream; and
    means for transmitting said alternative source digital datastream over said medium.

20. The apparatus of claim 19 wherein said means for determining when for said specific period of said source digital datastream there is an alternative source digital datastream that conveys a same information as said specific period of said source digital datastream and uses lower energy than said energy required to transmit said specific period of said source digital datastream over said medium further comprises a control agent.

\* \* \* \* \*